Figure 1:
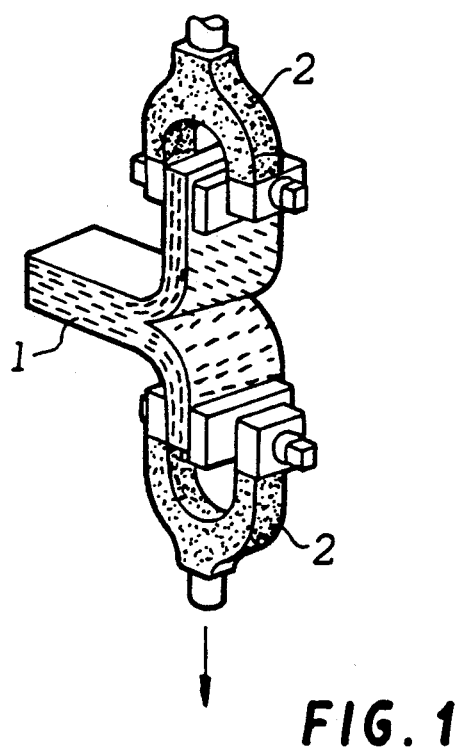

United States Patent [19]

Hosoi et al.

[11] Patent Number: 5,104,713
[45] Date of Patent: * Apr. 14, 1992

[54] ALUMINA FIBER STRUCTURE AND PROCESS FOR ITS PRODUCTION

[75] Inventors: Hisataka Hosoi, Joetsu; Hozumi Endo, Fujisawa; Tatsuo Ando, Yokohama; Mamoru Shoji, Joetsu, all of Japan

[73] Assignee: Mitsubishi Kasei Corporation, Tokyo, Japan

[*] Notice: The portion of the term of this patent subsequent to Jun. 21, 2005 has been disclaimed.

[21] Appl. No.: 492,925

[22] Filed: Mar. 13, 1990

Related U.S. Application Data

[60] Continuation-in-part of Ser. No. 178,604, Jun. 8, 1988, Pat. No. 4,931,239, which is a division of Ser. No. 800,026, Nov. 20, 1985, Pat. No. 4,752,515.

[30] Foreign Application Priority Data

Jun. 17, 1985 [JP] Japan ............... 60-131580
Jul. 16, 1985 [JP] Japan ............... 60-156599
Jul. 19, 1985 [JP] Japan ............... 60-159966
Sep. 4, 1985 [JP] Japan ............... 60-195619

[51] Int. Cl.⁵ .............................. B32B 5/12
[52] U.S. Cl. .................. 428/114; 29/432; 428/221; 428/224; 428/280; 428/284; 428/285; 428/297; 428/298; 428/300; 428/457
[58] Field of Search ......... 428/114, 221, 224, 280, 428/284, 285, 297, 298, 300, 457; 29/432

[56] References Cited

FOREIGN PATENT DOCUMENTS 009940  4/1980  European Pat. Off.
8302291 7/1983  PCT Int'l Appl.
1425934 2/1976  United Kingdom.
1480067 7/1977  United Kingdom.
2024788 7/1982  United Kingdom.
2055356 7/1983  United Kingdom.

Primary Examiner—Lorraine T. Kendell
Attorney, Agent, or Firm—Oblon, Spivak, McClelland, Maier & Neustadt

[57] ABSTRACT

An alumina fiber structure of a flat shape composed of alumina fibers having an alumina content of at least 65% by weight, the majority of said fibers being oriented substantially in parallel with the flat surfaces of the structure, and a number of fiber strands composed of the same alumina fibers extending inwardly from the flat surfaces of the structure, said structure having a thickness of from 4.8 mm to less than 10 mm, a density of from 0.07 to 0.3 g/cm³, a tensile strength of at least 0.5 kg/cm² and a peeling strength of at least 0.5 kg/m.

4 Claims, 1 Drawing Sheet

ALUMINA FIBER STRUCTURE AND PROCESS FOR ITS PRODUCTION

This is a Continuation-in-Part of U.S. Patent Application No. 07/178,604, filed Jun. 8, 1988, which is a division of U.S. Patent Application No. 06/800,026, filed Nov. 20, 1985, now U.S. Pat. No. 4,752,515.

The present invention relates to a structure composed of alumina fibers and a process for its production. More particularly, the present invention relates to an alumina fiber structure having high mechanical strength suitable for use as a refractory heat insulating material, and a process for its production.

Fibers made of an inorganic oxide such as alumina or silica have excellent heat resistance, and various structures prepared from such inorganic oxide fibers, are used as light weight refractory heat insulating materials. Such structures include products wherein fibers are bound by a binder, and non-woven products wherein fibers are laid without using any binder and bound by needling. In the non-woven products, the mechanical strength of the products derives from the intertwining of the fibers caused by the needling. However, among the inorganic oxide fibers, high alumina fibers containing at least 65% by weight of alumina are not used for a non-woven product, because it is difficult to obtain a non-woven product having high mechanical strength even when needling is applied to a laid mat of such high alumina fibers. The reason for the difficulty is not clearly understood, but the difficulty may be attributable to the fact that no adequate intertwining of such fibers takes place even when needling is applied to the mat. High alumina fibers containing at least 65% by weight of alumina are most commonly produced by a precursory fiber method. In this method, a viscous solution containing an aluminum compound as an essential component and a small amount of an organic polymer compound such as polyvinyl alcohol, is spun to form precursory fibers, and then the precursory fibers are burned at a high temperature and converted to alumina fibers, whereby high alumina fibers are produced.

Endo, one of the inventors of the present application, has found it possible to obtain a non-woven shaped product of high alumina fibers by laying, into a layered mat, precursory fibers, which would, after burning, comprise from 72 to 99% by weight of alumina and from 1 to 28% by weight of silica, needling the layered mat to obtain a non-woven structure composed of precursory fibers, and then burning the structure to convert the precursory fibers to high alumina fibers (Japanese Unexamined Patent Publication No. 88162/1985). Subsequently, Endo and Ando, another coinventor of the present invention, have found it possible to obtain a non-woven shaped product of high alumina fibers by a similar method also from precursory fibers which can be converted to high alumina fibers comprising from 65 to 72% by weight of alumina and from 28 to 35% by weight of silica, i.e. having a silica content higher than mullite ($3Al_2O_3.2SiO_2$) (Japanese Unexamined Patent Publication No. 173151/1985). These processes are highly evaluated in that they were the first to provide a non-woven shaped structure composed of high alumina fibers without using any binder. However, the shaped structures produced by these processes have a drawback that the tensile strength in the direction of the thickness, i.e. the peeling strength, is poor. This drawback is pronounced as the thickness of the structure increases. With a thick structure, separation is likely to occur readily at the center in the direction of the thickness even with a minimum force. According to the study made by the present inventors, the poor peeling strength of these structures is believed to be attributable to the fact that during the needling of the laid mat of the precursory fibers, the precursory fibers are likely to break when hooked and pulled by needles in the thickness direction. In other words, the precursory fibers have poor tensile strength, and when hooked and pulled by needles in the thickness direction, they tend to break one after another. Consequently, the longer the distance from the surface becomes, the smaller the number of fibers oriented by needling becomes. The peeling strength of the structure depends on the number of fibers oriented in the thickness direction by needling. Accordingly, the thicker the structure, i.e. the longer the distance from the surface of the structure to the center in the thickness direction becomes, the lower the peeling strength of the structure tends to be.

Under the circumstances, it is an object of the present invention to provide a non-woven structure composed of high alumina fibers containing at least 65% by weight of alumina, which has high mechanical strength in spite of the fact no binder is employed.

Another object of the present invention is to provide a non-woven structure having a substantial thickness and yet having high peeling strength.

A still further object of the present invention is to provide a process for producing such structures.

The present invention provides an alumina fiber structure of a flat shape composed of alumina fibers having an alumina content of at least 65% by weight, the majority of said fibers being oriented substantially in parallel with the flat surfaces of the structure, and a number of fiber strands composed of the same alumina fibers extending inwardly from the flat surfaces of the structure, said structure having a thickness of at least 10 mm, a density of from 0.07 to 0.3 $g/cm^3$, a tensile strength of at least 0.5 $kg/cm^2$ and a peeling strength of at least 0.5 kg/m.

Further, the present invention provides also a process for producing an alumina fiber structure, which comprises spinning a viscous spinning solution comprising compounds of metals including aluminum and an organic polymer compound, in which the proportion of aluminum in the total metals in the solution corresponds to at least 65% by weight of alumina when all the metals are calculated as their oxides, to obtain precursory fibers; laying the precursory fibers into a laid mat; applying a lubricant to the mat; needling the lubricated mat to obtain a flat structure of precursory fibers; and burning the structure at a temperature of at least 500° C. to convert the precursory fibers to alumina fibers having an alumina content of at least 65% by weight.

Now, the present invention will be described in detail with reference to the preferred embodiments.

In the accompanying drawing, FIG. 1 is a view illustrating a method for measuring the peeling strength of an alumina fiber structure. In the Figure, reference numeral 1 indicates a test piece of the alumina fiber structure, and numeral 2 indicates a clamping means for the test piece.

The structure of the present invention is composed essentially of alumina fibers containing at least 65% by weight of alumina. The alumina fibers may contain in addition to alumina, zirconia or other metal oxides.

The alumina fibers may preferably comprise from 65 to 98% by weight, more preferably from 70 to 98% by weight, of alumina and from 2 to 35% by weight, more preferably from 2 to 30% by weight, of silica. An alumina-silica composition comprising about 72% by weight of alumina and about 28% by weight of silica is commonly referred to as mullite ($3Al_2O_3.2SiO_2$). Alumina fibers made of mullite or a similar composition are one of the preferred fibers for the structures of the present invention. The fibers may optionally contain a small amount of other metal oxides. The alumina fibers usually have an average diameter (a diameter corresponding to the maximum value in the diagram of fiber diameter-fiber weight for a unit diameter of 1 μm) of at most 7 μm and an average length (a length corresponding to the maximum value in the diagram of fiber length-fiber weight for a unit length of 10 mm) of at least 30 mm. If the average diameter of the fibers is too large, the fibers themselves tend to be brittle, and the heat insulating properties of the final structure tend to be low. Further, the shorter the average fiber length, the lower the mechanical strength of the structure. The suitable average fiber diameter and the average fiber length, are at most 5 μm, and at least 50 mm, respectively. Particularly preferred are alumina fibers having an average fiber diameter of from 3 to 5 μm with the proportion of fibers thicker than 20 μm being substantially negligible and having an average fiber length of at least 50 mm with the proportion of fibers shorter than 10 mm being not more than 10% by weight.

The majority of the alumina fibers constituting the structure are oriented substantially in parallel with the flat surfaces of the structure. In other words, the alumina fibers are laid in layers parallel to the flat surfaces. The tensile strength of the structure improves as the parallel orientation to the flat surfaces increases. On the other hand, the orientation of the alumina fibers in the plane parallel to the flat surfaces is determined by the physical properties required for the structure. In other words, the tensile strength of the structure increases in the direction of the orientation of the alumina fibers and decreases in the direction perpendicular thereto. Accordingly, the alumina fibers may be oriented to the direction in which the strength is required. In a case where a structure having a minimum anisotropy, i.e. no substantial difference in the strength irrespective of the tensile directions, is desired, the orientation of the alumina fibers in the plane parallel to the flat surfaces, may be made random.

In the flat surfaces of the structure, fiber strands of alumina fibers extending inwardly from the surfaces, are regularly arranged. The fiber strands are made of the same alumina fibers as those constituting the main body of the structure. The number of fiber strands is usually from 3 to 20 strands per $cm^2$. The greater the number of fiber strands, the higher the density and the peeling strength of the structure generally become. The mechanical strength, particularly the peeling strength, of the structure is created by the intertwining of the fiber strands with the alumina fibers constituting the main body of the structure. The number of alumina fibers in one fiber strand is usually from 50 to 200. This number of fibers depends primarily on the needle used for the needling of the fiber mat, and the fiber strands may be composed of a number of fibers outside the above-mentioned range.

The structure of alumina fibers usually has a thickness of at least 10 mm. The structure of the present invention has a feature that it has high peeling strength in spite of such a thickness. However, if the thickness of the structure is too great, the breakage of fibers in the fiber strands during the needling increases, whereby it becomes difficult to maintain high peeling strength. In other words, when the cross-section of the structure is observed in the direction perpendicular to the flat surfaces, it is seen that fiber strands extend through the structure from one flat surface to the other flat surface. If no breakage of fibers takes place during the needling, the number of fibers constituting the fiber strands extending from one flat surface to the other flat surface is substantially constant. However, once breakage of fibers takes place, the number of fibers constituting the fiber strands gradually decreases from the one flat surface towards the other flat surface, and the fiber strands tend to be slender, and in an extreme case, the fiber strands diminish before they reach the other flat surface. As mentioned above, the peeling strength of the structure depends on the fiber strands, and the fiber strands preferably extend through the structure from one flat surface to the other flat surface substantially in the same thickness.

The structure of the present invention usually has a thickness of from 10 to 50 mm, preferably from 15 to 35 mm.

The structure has a density of from 0.07 to 0.3 $g/cm^3$, preferably from 0.085 to 0.15 $g/cm^3$. The density is related to the heat insulating properties of the refractory heat insulating material. In general, the structure having a density within the above-mentioned range is able to exhibit a satisfactory heat insulating performance under various conditions.

The structure of the present invention has adequate mechanical strength to be used as refractory heat insulating material. In other words, the structure has a tensile strength of at least 0.5 $kg/cm^2$ and a peeling strength of at least 0.5 kg/m. Preferably, the tensile strength of the structure is at least 1.0 $kg/cm^2$, and the peeling strength is at least 1.0 kg/m. Further, the structure has a size sufficiently large for a refractory heat insulating material, i.e. at least 0.27 m2 ($0.3 \times 0.9$ m). Usually, it has a size of from $0.6 \times 1.2$ m to $0.6 \times 3.6$ m.

The structure of the present invention is prepared by laying the precursory fibers obtained by a precursory fiber method, into a layered mat, then applying a lubricant thereto, needling the lubricated mat to obtain a non-woven structure having a flat shape, and then burning the structure to convert the precursory fibers to alumina fibers.

The production of the precursory fibers by the precursory fiber method, is conducted by preparing a viscous spinning solution in accordance with a conventional method, and then spinning the solution to obtain precursory fibers. The spinning solution is formulated by preparing an aqueous solution containing an aluminum compound such as aluminum oxychloride [$AlCl_n(OH)_{3-n}$] or aluminum acetate, and other metal compounds as optional components, adding an organic polymer compound thereto and concentrating the solution to a desired concentration and viscosity. It is also possible that an aqueous solution of metal compounds is concentrated first, and then an organic polymer compound is added to obtain a predetermined viscosity. The viscosity of the spinning solution is usually from 1 to 1000 poise, preferably from 15 to 60 poise. The concentration of the metal compounds in the spinning solution is usually from 25 to 35% by weight as calculated as metal oxides. As the organic polymer compound, there may be employed an organic polymer compound having a fiber-forming ability, for instance, a water-soluble synthetic polymer compound such as polyvinyl alcohol, polyethylene glycol or polyacrylamide, a soluble derivative of starch or cellulose such as acetic acid-modified starch, hydroxyethyl starch, methyl cellulose or carboxymethyl cellulose. The concentration of the organic polymer compound in the spinning solution is usually from 2 to 5% by weight. Preferred as the organic polymer compound is polyvinyl alcohol. As the aluminum compound in the spinning solution, aluminum oxychloride [$AlCl_n(OH)_{3-n}$] is preferred, and particularly preferred is the one having an atomic ratio of Al/Cl of from 1.6 to 1.9. Such a aluminum oxychloride may be readily prepared, for instance, by putting aluminum metal fragments in hydrochloric acid, and stirring the mixture to promote the dissolution of aluminum. In the spinning solution, other metal compounds such as silicon compounds or zirconium compounds, may optionally be incorporated. In a preferred embodiment of the present invention, the spinning solution contains a silicon compound, particularly silica sol. However, metal compounds other than the aluminum compound, should be limited so that when all the metal compounds are calculated as their oxides, alumina constitutes at least 65% by weight. Preferably, the spinning solution contains an aluminum compound and a silicon compound in such proportions that when all the metal compounds are calculated as their oxides, alumina constitutes from 65 to 98% by weight, preferably from 70 to 98% by weight, and silica constitutes from 2 to 35% by weight, preferably from 2 to 30% by weight. If desired, a part of the silicon compound may further be substituted by other metal compounds.

For the spinning of precursory fibers from the spinning solution, there may be employed a conventional method such as an extrusion method, a blowing method or a centrifugal method. For instance, in the case of the blowing method, the spinning is conducted by extruding the spinning solution adjusted to a level of from 5 to 100 poise from nozzles having a diameter of from 0.01 to 0.5 mm into a high velocity air stream. The extruded spinning solution is stretched and dried in the air stream at a temperature of not higher than 200° C., preferably from 0° to 100° C. to form precursory fibers. In this method, the precursory fibers are required to be adequately dried before they are collected from the air stream. If the drying is inadequate, the collected precursory fibers are likely to adhere to one another, or form liquid drops due to the recovery of resiliency.

On the other hand, if the spinning solution is directly extruded into a high temperature air stream to facilitate the drying, the precursory fibers formed from the spinning solution tend to dry before they are adequately stretched, whereby the resulting precursory fibers tend to be too large in diameter. Further, if the temperature of the air stream is too high, the metal compounds or the organic polymer compound constituting the precursory fibers are likely to undergo thermal decomposition, whereby the strength or flexibility of the precursory fibers tend to deteriorate. Therefore, when the spinning is conducted by the blowing method, it is preferred to extrude the spinning solution into an air stream of a low temperature of from 1° to 20° C., for example, 5° C., flowing at a high velocity to form precursory fibers adequately stretched in the air stream, and then introduce a high temperature air into this air stream to raise the temperature and to lower the relative humidity of the air stream to a level of higher than 25° C., and lower than 30% RH, respectively, to facilitate the drying of the precursory fibers. The diameter and length of the precursory fibers are determined by the diameter and the length of the alumina fibers required for the final structure. However, the diameter is usually from a few micrometers to some ten micrometers, and the length is usually from a few centimeter to some ten centimeters. The collection of the precursory fibers from the air stream is conducted by a conventional method. According to one of the preferred collecting methods, a steel wire net is disposed ar a right angle to the air stream to let the precursory fibers deposit on this net, and then the precursory fibers deposited on the net are recovered. According to this method, the precursory fibers can be laid substantially in a layered form on the net. Normally, when a layered product composed of the precursory fibers is formed in an amount of from 10 to 100 g/m², more preferably from 20 to 50 g/m², the layered product is recovered from the net, and some tens to hundreds layered products are laminated, and after the application of a lubricant, subjected to needling, whereby a structure composed of the precursory fibers is obtainable. Preferably, the layered products are laminated after the application of the lubricant to the layered products recovered from the steel wire net, and subjected to needling. In a preferred embodiment of the present invention, layered products are introduced in a chamber in which fine particles of the lubricant, that is to say, a mist of the lubricant, are floating, whereby the floating fine particles will be deposited on the layered products in the chamber, and the layered products are then laminated. The laminated precursory fiber products, are then taken out from the chamber, and subjected to needling. According to the method wherein the layered products are laminated after the application of the lubricant and subjected to needling, the lubricant is applied uniformly even into the interior of the precursory fiber mat.

In a particularly preferred embodiment of the present invention, a steel wire net in an endless belt form is disposed perpendicularly to the air stream containing the precursory fibers, and the precursory fibers are collected in the form of a layer on the net while the net is slowly rotated. The layer of the precursory fibers formed on the steel wire net is peeled off in the form of an endless belt from the net surface, and introduced in a chamber in which fine particles of a lubricant are floating, wherein the layered precursory fibers are laminated to a desired thickness. For the purpose of floating fine particles of the lubricant in the chamber, a spray apparatus may be provided in the chamber so that the lubricant is sprayed in the chamber. The most simple method for laminating the precursory fiber layers may be such that the precursory fiber layer of the endless belt form is wound up on a drum in the chamber.

In the present invention, the lubricant seems to have a function to reduce the friction between the precursory fibers themselves during the needling so that the precursory fiber strands may be pulled inwardly of the laid mat of the precursory fibers by the needle with less tension. Accordingly, it is preferred to apply the lubricant uniformly to the precursory fibers. As the lubricant, there may be employed any fiber-treating agent having a function to reduce the friction which is commonly employed in the fiber industry. Since the precursory fibers are made of water-soluble substance, the lubricant is preferably of a non-aqueous type. When an aqueous-type lubricant is employed, the precursory fibers tend to absorb moisture and disintegrate, or they are likely to adhere to one another. As a suitable lubricant, there may be mentioned a mixture of a hydrocarbon solvent such as mineral oil and an ester of a higher fatty acid such as lauric acid, palmitic acid or stearic acid with an aliphatic alcohol. The lubricant is used usually in an amount of from 0.1 to 5% by weight, preferably from 1 to 3% by weight, based on the precursory fibers.

The precursory fibers are preferably laid substantially in parallel with the surface to which the needling is applied, i.e. substantially in a layered structure. In this manner, it is possible to obtain a final structure of alumina fibers having excellent tensile strength.

The needling can be conducted in accordance with a conventional method. In general, the greater the number of needlings per unit area, the higher the bulk density and the peeling strength of the resulting precursory fiber structure or of the finally obtained alumina fiber structure. The number of needlings is usually from 1 to 50 needlings/cm$^2$, preferably from 3 to 20 needlings/cm$^2$. The needling is usually applied from both sides. It is usually preferred that the precursory fiber structure formed by the needling has a thickness of from 6 to 60 mm and a bulk density of from 0.06 to 0.25 g/cm$^3$.

By the needling, a precursory fiber structure is obtained in which fiber strands composed of the precursory fibers are regularly oriented inwardly from the flat surfaces. The needles used for the needling are preferably as slender as possible so long as the strength of the needles permits. If thick needles are employed, the frequency of breakage of the precursory fibers caused by the needles increases, and the finally obtainable alumina fiber structure tends to have needle holes, which impair the heat insulating properties of the structure.

The size of the fiber strand formed by the needling depends on the hook of the needle used for the needling. In general, one fiber strand is usually composed of from 50 to 200 precursory fibers. The penetrating speed of the needle into the precursory fiber mat for the needling is preferably as small as possible so long as the productivity permits. If the penetrating speed is too high, the precursory fibers constituting fiber strands are likely to break on their way, whereby the peeling strength of the finally obtained alumina fiber structure tends to be poor. The penetrating speed of the needle is usually from 0.5 to 10 cm/sec, preferably from 2 to 5 cm/sec.

The precursory fiber structure obtained by the needling, is then burned to form an alumina fiber structure. The burning is conducted until the temperature reaches a level of ar least 500° C., preferably at least 1100° C. The final temperature for the burning may vary depending upon the composition of the resulting alumina fibers and the desired physical properties thereof. The burning is conducted in an oxidizing atmosphere in accordance with a conventional method. In a preferred embodiment of the present invention, the temperature is raised at an average rate of at most 3.0° C./min, preferably at most 2.5° C./min, during the period where the burning atmosphere is from 300° to 500° C., and at an average rate higher by at least 1.5° C./min, preferably at least 2.0° C./min, than the temperature raising rate of the above temperature region, during the period where the burning atmosphere is from 500° to 1100° C. By gradually raising the temperature at an average rate of as slow as at most 3.0° C./min, preferably at most 2.5° C./min for the temperature range of from 300° to 500° C., it is possible to obtain an alumina fiber structure having high strength. The temperature raising rate in this temperature region is preferably as small as possible. However, the productivity will be lowered as the temperature raising rate decreases, and the consumption of the heat energy increases. Accordingly, it is industrially advantageous to set the temperature raising rate as high as possible within the range where an alumina fiber structure having the desired properties is obtainable. From such a viewpoint, a preferred range of the temperature raising rate is from 1.5° to 2.3° C./min.

Once the temperature region of from 300° to 500° C. has been passed with the above-mentioned temperature raising rate, the structure is heated to a temperature of 1100° C. at an average temperature raising rate higher by at least 1.5° C./min, preferably at least 2.0° C./min, than the temperature raising rate for the above temperature region. The temperature raising rate during this period is usually at least 4° C./min, preferably at least 4.5° C./min. The temperature raising rate may be smaller than 4° C./min, but such a low rate is disadvantageous from the viewpoint of the productivity and the energy consumption. The upper limit of the temperature raising rate for this temperature region is preferably 10° C./min. So long as the temperature raising rate is controlled to such a level, there will be no substantial deterioration of the physical properties of the resulting alumina fiber structure. The final temperature for heating is dependent upon the composition and the desired physical properties of the resulting alumina fiber structure. By the burning procedure, the precursory fiber structure loses moisture, organic substances and volatile substances formed from the metal compounds, whereby the weight is decreased. The weight reduction proceeds rapidly until the precursory fiber structure is heated to 300° C., and the weight reduction during this period is considered attributable mainly to the discharge of moisture. Accordingly, in a preferred embodiment of the present invention, the precursory fiber structure is placed in a furnace, and the furnace temperature is raised to 300° C. and maintained at this temperature. The temperature of the structure gradually increases as the moisture is discharged. When the temperature of the structure reaches the same 300° C. as the furnace temperature, the temperature of the atmosphere is gradually raised as mentioned above.

As the precursory fiber structure is converted to an alumina fiber structure, the volume decreases, and the bulk specific gravity usually increases. Accordingly, the shape and the bulk specific gravity of the precursory fiber structure are determined taking into account such changes as well as the size (the length, the width and the thickness) and the bulk specific gravity required for the alumina fiber structure. For instance, when an alumina fiber structure with a bulk specific gravity of 0.1 g/cm$^3$ is to be produced, the size and the bulk density of the precursory structure may be determined on the assumption that the length, width and thickness would decrease by about 20%, and the bulk density increases by about 20%.

Now, the present invention will be described in further detail with reference to Examples. However, it should be understood that the present invention is by no means restricted to these specific Examples.

In this specification, the bulk specific gravity and the thickness are represented by the values as measured under no load condition. The tensile strength and the peeling strength are measured by the following methods.

METHOD FOR MEASURING THE TENSILE STRENGTH

From the central portion of the final structure, two test pieces (a) and (b) are cut out with a length of 150 mm and a width of 50 mm in a mutually intersecting relation to each other.

Both ends in the lengthwise direction of each test piece was secured to the tensile strength tester, and the test piece was pulled in a vertical direction, whereby the maximum load (kg) was measured. The distance between the secured portions at both ends was 100 mm, and the tensile speed was 30 mm/min. The tensile strength was calculated from the measured value (kg) thereby obtained, in accordance with the following equation.

$$\text{Tensile strength (kg/cm}^2) = \frac{(\text{Measured value of } (a) + \text{Measured value of } (b)) \times \tfrac{1}{2} \times 1/5A \times 0.1/B}$$

A = Thickness of the test piece (cm)
B = Specific gravity of the test piece

METHOD FOR MEASURING THE PEELING STRENGTH

From the center portion of the final structure, two test pieces (a) and (b) were cut out with a length of 100 mm and a width of 50 mm, in a mutually intersecting direction to each other. One end in the lengthwise direction of each test piece was peeled at a ½ position in the thickness direction for about 30 mm, and both ends thereby formed were secured to the tensile strength tester, and pulled in a vertical direction at a rate of 10 mm/min, whereby the maximum load (kg) was measured. The peeling strength was calculated from the measured value (kg) in accordance with the following equation.

$$\text{Peeling strength } (kg/m) = (\text{Measured value of } (a) + \text{Measured value of } (b)) \times \tfrac{1}{2} \times 1/0.05$$

EXAMPLE 1

Aluminum was dissolved in hydrochloric acid and converted to aluminum oxychloride $[AlCl_n(OH)_{3-n}]$, and silica sol was added thereto to obtain a solution containing an aluminum component and a silicon component.

This solution was concentrated, and an aqueous solution of polyvinyl alcohol was added thereto to obtain a spinning solution having a metal content of about 30% by weight as oxides (weight ratio of $Al_2O_3/SiO_2 = 72/28$) and a viscosity of about 25 poise.

This spinning solution was extruded from spinning nozzles into a high speed air stream for spinning, and precursory fibers carried by the air stream were collected by a rotating steel wire net disposed perpendicularly to the air stream to obtain a thin fiber layer of about 30 g/m² composed of precursory fibers having a diameter of about 4-6 μm and a length of 50-200 mm. To this layer, a lubricant was applied in an amount of about 30 ml/kg. Eighty layers of this type were laminated and subjected to needling. A solution obtained by dissolving 1 part by weight of a higher fatty acid ester in 9 parts by weight of mineral oil was used as the lubricant. The needling was conducted at a rate of 5 needlings/cm². The precursory fiber structure thereby formed had a size of 2000×650 mm, a thickness of about 30 mm and a bulk density of about 0.08 g/cm³.

The structure was placed in a furnace maintained at a temperature of about 300° C., and kept for 2 hours so that even the interior of the structure reached 300° C. Then, the temperature of the atmosphere was gradually raised at a rate of 2° C./min for the temperature range of from 300° to 550° C. and at a rate of 5° C./min for the temperature range of from 550 to 1250° C., and then maintained at 1250° C. for 30 minutes to complete the burning.

The alumina fiber structure thereby obtained had a fiber diameter of from 3 to 4 μm, a thickness of about 25 mm, a bulk density of about 0.1 g/cm³, a tensile strength of 1.2 kg/cm² and a peeling strength of 1.3 kg/m.

The tensile strength and the peeling strength were measured by using an electrically controlled all-purpose tester Autograph IS-500 manufactured by Shimadzu Corporation.

Further, one fiber strand contained about 70-130 fibers.

EXAMPLE 2

An alumina fiber structure was obtained in the same manner as in Example 1 except that the needling was conducted at a rate of 15 needlings/cm². The structure had a thickness of about 12-13 mm, a bulk density of about 0.2 g/cm³, a peeling strength of 2.5 kg/m. The tensile strength was not actually measured, but it was assumed to be at least 1.5 kg/cm².

EXAMPLE 3

An alumina fiber structure was prepared in the same manner as in Example 1, except that the needling was conducted at a rate of 10 needlings/cm² to form a precursory fiber structure having a thickness of 7.5 mm (bulk density = 0.08 g/cm³). The structure burnt in the same manner as in Example 1 had a thickness of 6 mm, a bulk density of 0.1 g/cm³, a tensile strength of 1.0 kg/cm², and a peeling strength of 1.0 kg/m.

COMPARATIVE EXAMPLE

An alumina fiber structure was prepared in the same manner as in Example 1, except that a lubricant was not used, and that the needling was conducted at a rate of 10 needlings/cm² to form a precursory fiber structure having a thickness of 8 mm (bulk density=0.06 g/cm³). It was impossible to obtain a precursory fiber structure having a bulk density of 0.08 g/cm³ since fibers were cut and damaged. The structure burnt in the same manner as in Example 1 had a thickness of 6.4 mm and a bulk density of 0.075 g/cm³, but a tensile strength and a peeling strength were too weak to be measured.

What is claimed as new and desired to be secured by Letters Patent of United States is:

1. A flat alumina fiber structure composed of alumina fibers having an alumina content of at least 65% by weight, the majority of said fibers being oriented substantially parallel to the flat surfaces of the structure, and many of said alumina fibers forming fiber strands which extend inwardly in the thickness dimension of the flat structure in the direction from one flat surface of the structure to the remaining flat surface of the structure as the result of a needling step applied in the process of preparation, said structure having a thickness of from 4.8 mm to less than 10 mm, a density of from 0.07 to 0.3 g/cm$^3$, a tensile strength of at least 0.5 kg/cm$^2$ and a peeling strength of at least 0.5 g/cm$^3$.

2. The alumina fiber structure according to claim 1, which has a density of from 0.085 to 0.15 g/cm$^3$.

3. The alumina fiber structure according to claim 1, wherein said alumina fibers comprise at least 65% by weight of alumina and the rest being substantially silica.

4. The alumina fiber structure according to claim 1, wherein said alumina fibers have an average diameter of at most 7 μm and an average length of at least 30 mm.

* * * * *